United States Patent
Mårs et al.

(10) Patent No.: US 9,193,011 B2
(45) Date of Patent: *Nov. 24, 2015

(54) IRON-CHROMIUM BASED BRAZING FILLER METAL

(75) Inventors: Owe Mårs, Höganäs (SE); Ulrika Persson, Helsingborg (SE)

(73) Assignee: HOGANAS AB (PUBL), Hoganas (SE)

( * ) Notice: Subject to any disclaimer, the term of this patent is extended or adjusted under 35 U.S.C. 154(b) by 582 days.

This patent is subject to a terminal disclaimer.

(21) Appl. No.: 12/921,288

(22) PCT Filed: Mar. 16, 2009

(86) PCT No.: PCT/SE2009/050266
§ 371 (c)(1),
(2), (4) Date: Sep. 28, 2010

(87) PCT Pub. No.: WO2009/116931
PCT Pub. Date: Sep. 24, 2009

(65) Prior Publication Data
US 2011/0014491 A1    Jan. 20, 2011

Related U.S. Application Data

(60) Provisional application No. 61/064,836, filed on Mar. 28, 2008.

(30) Foreign Application Priority Data

Mar. 19, 2008    (DK) .................................. 2008 00424

(51) Int. Cl.
*B32B 15/00*    (2006.01)
*C22C 38/42*    (2006.01)
(Continued)

(52) U.S. Cl.
CPC ............. *B23K 35/0244* (2013.01); *B23K 35/02* (2013.01); *B23K 35/025* (2013.01);
(Continued)

(58) Field of Classification Search
CPC ........................................................ B23K 35/025
USPC ....................... 228/101; 420/42, 582; 428/615
See application file for complete search history.

(56) References Cited

U.S. PATENT DOCUMENTS 2,762,706 A * 9/1956 Cape .............................. 420/442
4,218,248 A * 8/1980 Snyder et al. ................. 106/1.12
(Continued)

FOREIGN PATENT DOCUMENTS

EP    1 875 984    1/2008
JP    02015875 A * 1/1990 ............... B23K 1/19
(Continued)

OTHER PUBLICATIONS
International Search Report (PCT/ISA/210) dated Mar. 19, 2008.
(Continued)

*Primary Examiner* — Kaj K Olsen
*Assistant Examiner* — Alexander Polyansky
(74) *Attorney, Agent, or Firm* — Buchanan Ingersoll & Rooney P.C.

(57) ABSTRACT

An iron-chromium based brazing filler metal is provided which exhibits an excellent wetting behavior on a stainless steel base material. The brazing filler metal produces a brazed joint which exhibits high strength and good corrosion resistance. The brazing filler metal is suitable for brazing stainless steel and other materials where corrosion resistance and high strength is required. Typical examples of applications are heat exchangers and catalytic converters. The iron-chromium based brazing filler metal powder according to the invention comprises: between 11 and 35 wt % chromium, between 0 and 30 wt % nickel, between 2 and 20 wt % copper, between 2 and 6 wt % silicon, between 4 and 8 wt % phosporous, between 0-10 wt % manganese, and at least 20 wt % iron.

14 Claims, 2 Drawing Sheets

(51) Int. Cl.
  *C22C 30/02* (2006.01)
  *B23K 35/02* (2006.01)
  *B23K 35/30* (2006.01)
  *C22C 33/02* (2006.01)
  *C22C 38/20* (2006.01)
  *C22C 38/34* (2006.01)
  *C22C 38/38* (2006.01)
  *C22C 38/58* (2006.01)
  *B23K 1/00* (2006.01)

(52) U.S. Cl.
  CPC ............ *B23K 35/30* (2013.01); *B23K 35/3086* (2013.01); *C22C 30/02* (2013.01); *C22C 33/0285* (2013.01); *C22C 38/20* (2013.01); *C22C 38/34* (2013.01); *C22C 38/38* (2013.01); *C22C 38/42* (2013.01); *C22C 38/58* (2013.01); *B22F 2998/00* (2013.01); *B23K 2201/14* (2013.01); *B23K 2203/04* (2013.01); *Y10T 428/12493* (2015.01)

(56) References Cited

U.S. PATENT DOCUMENTS

| | | | |
|---|---|---|---|
| 4,444,587 | A | 4/1984 | Kelly |
| 6,203,754 | B1 | 3/2001 | Sugiyama |
| 6,696,017 | B2 | 2/2004 | Nagai et al. |
| 2004/0056074 | A1 | 3/2004 | Sjodin |
| 2004/0184945 | A1 | 9/2004 | Sjodin |
| 2008/0006676 | A1 | 1/2008 | Rangaswamy et al. |

FOREIGN PATENT DOCUMENTS

| | | |
|---|---|---|
| WO | WO 02/098600 | 12/2002 |
| WO | WO 2008/060225 | 5/2008 |
| WO | WO 2008/060226 | 5/2008 |

OTHER PUBLICATIONS

Written Opinion (PCT/ISA/237) dated Mar. 19, 2008.

* cited by examiner

A = joint overlap
W = width
T = thickness
D = joint clearance
L = length

1: No corrosion
2: Possible corrosion
3: Corrosion
4: Corrosion w. cracks

IRON-CHROMIUM BASED BRAZING FILLER METAL

SUMMARY OF THE INVENTION

This invention relates to a brazing filler metal with excellent wetting behaviour on stainless steel base material. The brazing filler metal produces a brazed joint with high strength and good corrosion resistance.

The brazing filler metal may be provided in powder form and formation into powder of the brazing filler metal may be accomplished using methods known in the art. For example, powders having the composition defined in the claims can be made by melting a homogeneous alloy and converting them to a powder by an atomization process. The mean particle size of the powder can range between 10-150 μm, normally between 10-100 μm.

The brazing filler metal powder according to the invention is an alloy containing between 11 wt % and 35 wt % chromium, between 2 wt % and 20 wt % copper, between 0 wt % and 30 wt % nickel and between 2 wt % and 6 wt % silicon, between 4 wt % and 8 wt % phosphorous and at least 20 wt % of iron. The brazing filler metal may also contain manganese up to 10 wt %. The brazing filler metal is suitable for production of catalytic converters and heat exchangers.

FIELD OF INVENTION

This invention relates to an iron-chromium based brazing filler metal suitable for brazing stainless steel and other materials where corrosion resistance and high strength is required. Typical examples of applications are heat exchangers and catalytic converters.

BACKGROUND OF THE INVENTION

Brazing is a process for joining metal parts with the help of brazing filler metal and heating. The melting temperature of the brazing filler metal must be below the melting temperature of the base material but above 450° C. If the brazing filler metal has a braze temperature below 450° C. the joining process is called soldering. The most commonly used brazing filler metals for brazing stainless steels are based on copper or nickel. Copper based brazing filler metals are preferred when considering cost advantages while nickel based brazing filler metals are needed in high corrosion and high strength applications. Copper is for Nickel based brazing filler metals with high chromium content are used for their high corrosion resistance in applications exposed to corrosive environments. Nickel based brazing filler metals may also be used in high service temperature applications and/or when high strength is required in the application. A typical application exposed to both corrosive environment and high service temperature is the exhaust gas recirculation (EGR) cooler in automotive diesel engines. Brazing filler metals for these applications must have certain properties to be suitable to use such as; corrosion resistance, resistance to high temperature oxidation, good wetting of the base material, without causing embrittlement of the base material during brazing.

RELATED ART

There are several different types of nickel based brazing filler metals listed in the American Welding Society (ANSI/AWS A 5.8) standard. Many of these nickel based brazing filler metals are used for brazing heat exchangers. BNi-2 with the composition Ni-7Cr-3B-4,5Si-3Fe is used for producing high strength joints in high temperature applications. The presence of boron is, however, a disadvantage since it may cause embrittlement of the base material when boron is diffused into the base material. Other nickel based brazing filler metal containing boron has the same disadvantage.

To overcome the disadvantage of boron other nickel based brazing filler metals were developed. BNi-5 (Ni-19Cr-10Si) has high corrosion resistance due to the high chromium content. The brazing temperature for this alloy is rather high (1150-1200° C.). Other boron free nickel based brazing filler metals are BNi-6 (Ni-10P) and BNi7 (Ni-14Cr-10P). The brazing temperature for these brazing filler metals are lower due to the high content of phosphorous; 10 wt %. The high phosphorous content (10 wt %) may form a brazed joint without the required strength due to the risk to form phosphorous containing brittle phases.

Another nickel based brazing filler metal is described in patent U.S. Pat. No. 6,696,017 and U.S. Pat. No. 6,203,754. This brazing filler metal has the composition Ni-29Cr-6P-4Si and combines high strength and high corrosion resistance with a fairly low braze temperature (1050-1100° C.). This brazing filler metal was specially developed for the new generation of EGR coolers used in high corrosive environment.

The disadvantage with all nickel based brazing filler metals is the high content of expensive nickel. The nickel content is at least 60%, but normally higher. The high nickel content in these brazing filler metals makes the brazing filler metals and the production of heat exchangers and catalytic converters costly.

To overcome the disadvantage with the costly nickel based brazing filler metals the possibility to use iron based brazing filler metals has been studied. There are two existing iron based brazing filler metals on the market. AlfaNova, described in PCT-application WO02098600, has a composition close to stainless steel with addition of silicon, phosphorous and boron to reduce the melting point of the brazing filler metal. The braze temperature for this alloy is 1190° C.

Another iron based brazing filler metal, AMDRY805, described in US-application US20080006676 A1 has the composition Fe-29Cr-18Ni-7Si-6P. This alloy is boron free to overcome the disadvantage with boron. The braze temperature for this alloy is 1176° C.

The highest practical temperature consistent with limited grain growth is 1095° C., according to ASM speciality hand book Stainless Steel, 1994, page 291. Therefore a low brazing temperature is preferred to avoid the problems associated with grain growth, such as worsened ductility and hardness, in the base material.

DETAILED DESCRIPTION OF THE INVENTION

This invention relates to an iron-chromium based brazing filler metal with excellent wetting on stainless steel. The brazing filler metal produces high strength brazed joints with good corrosion resistance and is significantly lower in cost compared to nickel based brazing filler metals. This brazing filler metal is suitable for brazing different types of heat exchangers and catalytic converters at a significantly lower cost than conventional nickel based brazing filler metals.

The typical use for this brazing filler metal is high temperature applications operating in corrosive environments. These applications can be different types of heat exchangers (plate or pipe) that are used in automotive applications, exhaust gas recirculation for example. Catalytic converters of different types are also possible applications.

The composition of the brazing filler metal according to this invention is

Copper about 2-20 wt %, preferably 5-15 wt %
Chromium about 11-35 wt %, preferably 20-30 wt %
Nickel about 0-30 wt %, preferably 10-20 wt %
Silicon about 2-6 wt %
Phosphorous about 4-8 wt %
Iron at a content of at least 20 wt %

Other components than those listed can be present. The total amount of components is adjusted such as to add up to 100 wt %.

The brazing filler metal may optionally contain manganese up to 10 wt %, preferably less than 7 wt %.

It is recognized that it can be advantageous for the composition of the main components of the brazing filler material to be similar to the composition of the stainless steel base material. Examples of stainless steel grades are 316L having a typical composition of Fe-17Cr-13,5Ni-2,2Mo and 304L, having a typical composition of Fe-18,8Cr-11,2Ni. All stainless steel contain by definition a minimum of 11% chromium and few stainless steels contains more then 30% chromium. Chromium content above 11% is required for the formation of the protective chromium oxide layer which gives the steel its corrosion resistant characteristics. The higher chromium content the better corrosion resistance but contents above 35% may cause decrease in the joint strength. Thus the chromium content should be between 11 and 35 wt %, preferably 20-30 wt %.

To reduce the melting point of the alloy, melting point depressants are added. It is well known that silicon, boron and phosphorous are effective melting point depressants. Studying the phase diagram for Fe—P it is found that the system has a melting point minimum of 1100° C. at approx 10 wt % phosphorous. The Fe—Si system has a melting point of 1380° C. at 10 wt % Si and a melting point minimum of approx 1210° C. at approx 19 wt % Si. Contents of phosphorous and silicon above 10 wt % each is not desirable since the risk for brittle phase formation is too high. It is therefore preferred to keep the phosphorous content between 4 and 8 wt % and silicon between 2 and 6 wt %.

The Fe—B system has a melting point minimum of 1174° C. at approx 4wt % boron. However boron has the disadvantage to cause embrittlement of the brazed component. Boron is an interstitial and because of its small diameter it can quickly diffuse into the lattice of the base material and form the brittle CrB phase. Due to the diffusion of boron the re-melting temperature of the alloy is raised which in some cases is a desirable effect. U.S. Pat. No. 4,444,587 describes how manganese can be a good substitute for boron since manganese also depresses the melting point. 10-30wt % manganese together with silicon and carbon will in the iron-based system lower the melting temperature with over 200° C. Secondly, manganese will almost completely vaporize during the brazing cycle which will allow rising of the re-melting temperature but without the risk of forming any brittle phases like CrB.

Nickel stabilises austenite which enhances the oxidation resistance of the alloy. Nickel also increases the toughness of the brazed joint. Looking at the tertiary phase diagram for Cr—Fe—Ni it can be seen that nickel also has a melting point depressing effect. With 30 wt % Cr and 20 wt % Ni the melting point of the Cr—Fe—Ni system is approx 1470° C. according to ASM speciality hand book Stainless Steel. The nickel content of the brazing filler metal related to this invention should be kept below 30 wt % to minimize the cost of the brazing filler metal.

Surprisingly it was found that copper reduces the diffusion of silicon and phosphorous into the base material during the brazing operation. The precipitation of phosphorous is also prevented. It was also unexpectedly found that the presence of copper has a positive effect on the corrosion resistance resulting in less weight loss when immersed in 10% HCl or 10% $H_2SO_4$. It is believed that 2 wt % copper is needed to gain the positive effect of copper. The copper content of the brazing filler metal covered by this invention should be kept below 20 wt % in order not to differ too much in chemistry from the base material to be brazed. Thus the copper content should be between 2 and 20 wt %, preferably 5-15 wt %.

The brazing filler metal according to this invention is in the form of powder and can be produced by either gas or water atomization. The brazing filler metal can be used in the form of powder or converted to a paste, tape, foil or other forms by conventional methods. Depending on the application technique different particle size distribution is needed but the mean particle size of the brazing filler metal powder is 10-100 μm.

The brazing filler metal is suitable for vacuum furnace brazing using vacuum ($<10^{-3}$ Torr). The brazing filler metal has a melting point below 1100° C. and produce joints at a brazing temperature of 1120° C. having high strength and good corrosion resistance without any observed grain growth.

The brazing filler metal in the form of paste, tape, foil or other forms is placed at the gap or in the gap between the surfaces of the base material which are to be joined. During heating the brazing filler metal melts and by capillary forces the melted brazing filler metal wets the surface of the base material and flows into the gap. During cooling it forms a solid brazed joint. Because the brazing filler metal is acting on capillary forces the wetting of the brazing filler metal on the base material to be brazed is crucial. The brazing filler metal covered by this invention has excellent wetting on stainless steel base material. The brazing filler metal also has good gap width tolerance and is able to braze gaps above 500 μm.

The joints brazed with the brazing filler metal according to this invention have a microstructure consisting of a homogenous mix of Cr—P rich phases and Ni—Fe—Si—Cu rich phases. Surprisingly it was found that the diffusion of silicon and phosphorous was limited by the presence of copper in the brazing filler metal. The precipitation of phosphorus at the grain boundaries in the base material was also prevented by the presence of Cu. The brazing filler metals without copper had a wider diffusion zone in the base material and there was also precipitation of phosphorous at the grain boundaries which may cause embrittlement of the base material.

EXAMPLES

As reference materials three brazing filler metals were used; one iron based brazing filler metal, Fe29Cr18Ni7Si6P, and two nickel based brazing filler metals, BNi5 and HBNi613. Fe29Cr18Ni7Si6P is an iron based brazing filler metal described in patent application US2008006676. BNi5 with the composition Ni-19Cr-10Si is a standard nickel based grade and HBNi613 with the composition Ni-30Cr-6P-4Si is a nickel based brazing filler metal produced by Höganäs AB.

Further, eight different brazing filler metals, three according to the invention and five as comparative examples, were prepared by water atomization.

Table 1 shows the actual composition of the produced brazing filler metals. The amount of each component is given in weight percent. The expression 'bal' (balance) means that the remaining material in the melt consists of Fe. According to the invention, the filler metal powder comprises at least 20 wt % Fe, and the remaining components are adjusted within the indicated limits in order to add up to 100 wt %. Trace elements are results of inevitable impurities caused by the method of production are present in such a small amount that they do not influence the properties of the brazing filler material. Trace elements are normally present in an amount smaller than 1 wt %.

A first criteria to be satisfied for the brazing filler material is that the braze temperature should preferably be 1120° C. or lower. It can be seen in table 1 that the temperature at which the brazing filler metal melts and brazes is affected by copper, phosphorous and silicon.

The methods used for testing the properties are as follows:

1) Wetting Test.

The brazing filler metal 0.2 grams, was placed on a substrate of 304 stainless steel plate having the dimensions 50*50 mm. The substrates with the brazing filler metal were then heated at 1120° C. for 10 min in vacuum of $10^{-4}$ Torr. The wetting was determined in terms of spreading ration defined as;

$$S=A_f/A_s$$

where $A_f$ is the area covered by the melted filler metal and $A_s$ the substrate area.

From table 2 it can be seen that the brazing filler metals with copper and high phosphorous (4, 7, 8) have good wetting. The brazing filler metal covered by this invention has better wetting on stainless steel base material than the reference material Fe29Cr18Ni7Si6P and as good as or better than the reference material BNi5.

2) MetalloGraphic Examination

Figure 1:
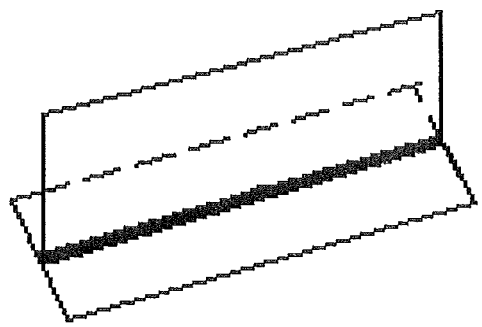
FIG. 1 shows a T-specimen used for the braze test.
Figure 2:
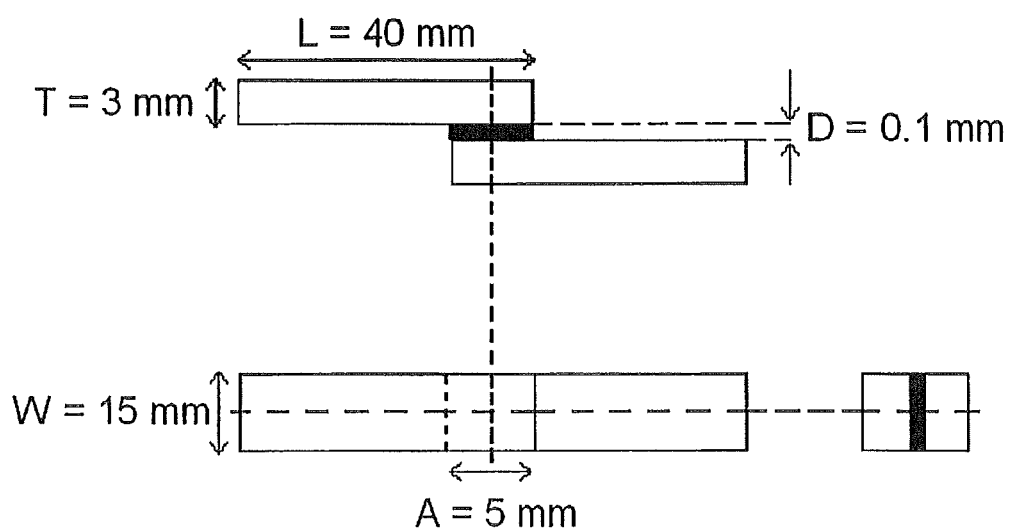
FIG. 2 shows a specimen used for joint strength test.

The brazing filler metal was converted to a paste by mixing the metal powder with a binder. 304 stainless steel was used as base material. T-specimens, according to FIG. 1 were brazed at 1100° C. for 10 min in vacuum of $10^{-4}$ Torr. After brazing the T-specimens were cross-sectioned. The cross section area of the brazed joint was investigated in Light Optical Microscope. A good brazed joint is identified as a pore and crack free joint with a homogenous microstructure.

As seen in table 2 all alloys formed solid joints without cracks or pores. The brazing filler metal alloy according to this invention (4, 7, 8) forms a homogenous microstructure with limited diffusion of elements into the base material and no precipitation of phosphorous at the grain boundaries. Grain boundary precipitation of phosphorous is found when using brazing filler metals without copper (1, 5).

3) Joint Strength.

Joint strength was tested using procedures similar to those recommended in ANSI/AWS C3.2M/C3.2.2001 for the lap type joint configuration with 100 μm.parallel clearance. The brazing filler metal was converted to a paste by mixing the brazing filler metal with a binder. The joint strength specimens with the paste were then heated to 1120° C. for 60 min in vacuum of $10^{-4}$ Torr.

From table 2 it can be seen that the strength of the brazing filler metals with copper were in the same range in strength as the nickel based reference BNi5.

4) Corrosion Tests

The corrosion was measured as weight loss of the brazing filler metal after seven days in corrosion media. The brazing filler metal was melted into small tablets. The tablets were placed in beakers with water solutions of 10% HCl and 10% $H_2SO_4$ respectively. The tablets were weighed before placed in the beakers and after seven days. The weight loss was calculated.

In table 2 it can be seen that the brazing filler metals containing copper (4, 7 and 8) had less weight loss than the brazing filler metals without copper (1, 5). Furthermore, the brazing filler metal according to the invention has a corrosion resistance comparable to the nickel based reference materials BNi5 and HBNi613 and better corrosion resistance than the reference iron based brazing filler metal Fe29Cr18Ni7Si6P.

A second corrosion test was performed where the brazed joints were evaluated. The same T-specimens (see FIG. 1) as used for braze test were manufactured and utilised. Each T-specimen was placed in a beaker with a corrosion media for four weeks and thereafter inspected for signs of corrosion. A total of twelve T-specimens were produced: three specimens using alloy 7 comprised by the invention, three specimens using BNi5, three specimens using HBNi613 and three specimens using Fe29Cr18Ni7Si6P as brazing material. The corrosion media used were water solutions of 10% by weight of $HNO_3$, 10% by weight of $H_2SO$ and 10% by weight of HCl. In this test Alloy 7 which represents the composition covered by this invention was compared to nickel based reference brazing filler metals, BNi5 and HBNi613 as well as the iron based reference brazing filler metal Fe29Cr18Ni7Si6P.

Figure 3:
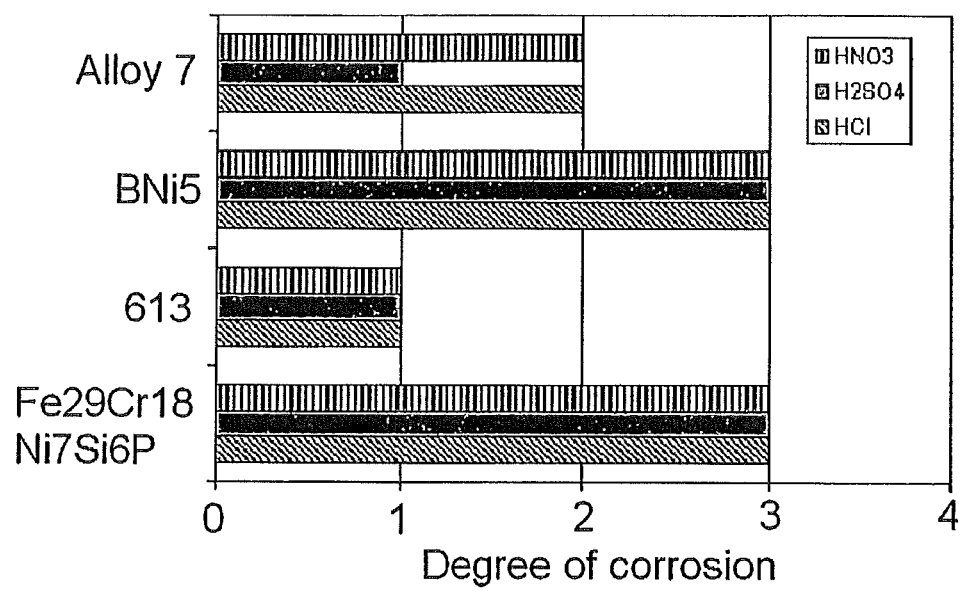
FIG. 3 shows the results of a second corrosion test where specimens are placed for four weeks in a corrosion media.

The result is found in FIG. 3. As seen, Alloy 7 shows no corrosion after four weeks in $H_2SO_4$ and only possible corrosion after four weeks in HCl and $HNO_3$. This is better than the results for the iron based reference brazing filler metal Fe28Cr18Ni7Si6P which proves the positive effect of Cu in an iron-chromium-based brazing material.

TABLE 1

Chemistry and melting temperature of the tested brazing filler metals.

| Alloy | | Fe | Cu | Ni | Cr | P | Si | Mn | Melting @ 1120° C. |
|---|---|---|---|---|---|---|---|---|---|
| 1 | Comp. | bal | — | 10.7 | 20.9 | 6.7 | 5.7 | 5.7 | completely |
| 2 | Comp. | bal | 10 | 10.4 | 20.5 | 3.5 | 4.1 | 5.3 | not |
| 3 | Comp. | bal | — | 20.9 | 20.4 | 3.76 | 5.8 | — | not |
| 4 | Inv. | bal | 10.4 | 20.4 | 20.4 | 6.8 | 3.9 | — | completely |
| 5 | Comp. | bal | — | 10.6 | 27.2 | 6.8 | 3.8 | — | completely |
| 6 | Comp. | bal | — | 20.3 | 27.2 | 4.2 | 4 | 5.3 | partly |
| 7 | Inv. | bal | 10 | 20.1 | 27.3 | 6.9 | 4.91 | 5.2 | completely |
| 8 | Inv | bal | 5.18 | 15.1 | 23.5 | 5.96 | 4.9 | 2.76 | Completely |

TABLE 2

Results from wetting test, metallographic examination, joint strength test and corrosion tests.

| Alloy | | Wetting (%) | Microstructure in the brazed joint | Joint Strength (N/mm$^2$) | Weight loss (g) | |
|---|---|---|---|---|---|---|
| | | | | | 10% HCl | 10% H$_2$SO$_4$ |
| 1 | Comp. | 20 | Not homogenous microstructure Diffusion into base material, precipitation of P at grain boundaries | 93 | 0.159 (16%) | 0.080 (8%) |
| 4 | Inv | 45 | Homogenous microstructure Limited diffusion into base material | 98 | 0.016 (1.6%) | 0.012 (1.2%) |
| 5 | Comp | 30 | Homogenous microstructure Diffusion into base material, precipitation of P at grain boundaries | 110 | 0.021 (0.2%) | 0.029 (0.3%) |
| 7 | Inv | 40 | Homogenous microstructure Limited diffusion into base material | 97 | 0.004 (0.4%) | 0.006 (0.6%) |
| 8 | Inv | 30 | Homogenous microstructure Limited diffusion into base material | 92 | 0.014 (1.4%) | 0.008 (0.8%) |
| Fe29Cr18Ni7Si6P | Ref | 15 | Not homogenous microstructure Diffusion into base material | 98 | 0.045 (4.5%) | 0.014 (1.4%) |
| BNi5 | Ref | 30 | Homogenous microstructure Limited diffusion into base material | 88 | 0.011 (1.1%) | 0.014 (1.4%) |
| HBNi613 | Ref | 60 | Homogenous microstructure Limited diffusion into base material | 126 | 0.005 (0.5%) | 0.010 (1%) |

The invention claimed is:

1. An iron-chromium based brazing filler metal powder suitable for brazing of stainless steel base material consisting of:
   between 11 and 35 wt % chromium,
   between 0 and 30 wt % nickel,
   between 5 and 15 wt % copper,
   between 2 and 6 wt % silicon,
   between 4 and 8 wt % phosphorous,
   between 0-10 wt % manganese,
   less than 1 wt % inevitable impurities,
   and at least 20 wt % iron,
   wherein the iron based brazing filler metal powder has a mean particle size of 10-100 μm.

2. The brazing filler metal powder according to claim 1, wherein the nickel content is between 10 and 20 wt %.

3. The brazing filler metal powder according to claim 1, wherein the manganese content is below 7 wt %.

4. The brazing filler metal powder according to claim 1, wherein the chromium content is between 20 and 30 wt %.

5. The brazing filler metal powder according to claim 1, wherein the iron based brazing filler metal is converted to paste, tape, or foil by conventional methods.

6. A method for furnace brazing comprising utilizing the iron-chromium brazing filler powder according to claim 1.

7. A method for brazing heat exchangers and catalytic converters comprising utilizing the iron-chromium brazing filler powder according to claim 1.

8. A brazed product wherein iron-based materials are joined by brazing with the iron-chromium based brazing filler metal powder according to claim 1.

9. The brazing filler metal powder according to claim 1, wherein the nickel content is between 10 and 20 wt %.

10. The brazing filler metal powder according to claim 1, wherein the nickel content is between 10 and 20 wt %, and wherein the chromium is between 20 and 30 wt %.

11. An iron-chromium based brazing filler metal powder suitable for brazing of stainless steel base material consisting of:
    11 and 35 wt % chromium,
    10 and 20 wt % nickel,
    5 and 15 wt % copper,
    2 and 6 wt % silicon,
    4 and 8 wt % phosphorous,
    0-10 wt % manganese,
    less than 1 wt % inevitable impurities,
    and at least 20 wt % iron.

12. An iron-chromium based brazing filler metal powder suitable for brazing of stainless steel base material consisting of:
    20 and 30 wt % chromium,
    0 and 30 wt % nickel,
    5 and 15 wt % copper,
    2 and 6 wt % silicon,
    4 and 8 wt % phosphorous,
    0-10 wt % manganese,
    less than 1 wt % inevitable impurities,
    and at least 20 wt % iron.

13. An iron-chromium based brazing filler metal powder suitable for brazing of stainless steel base material consisting of:
    11 and 35 wt % chromium,
    0 and 30 wt % nickel,
    5 and 15 wt % copper,
    2 and 6 wt % silicon,
    4 and 8 wt % phosphorous,
    0-10 wt % manganese,
    less than 1 wt % inevitable impurities,
    and at least 20 wt % iron,
    wherein the iron based brazing filler metal is converted to paste, tape, or foil by conventional methods.

14. An iron-chromium based brazing filler metal powder suitable for brazing of stainless steel base material consisting of:

between 11 and 35 wt % chromium,
between 0 and 30 wt % nickel,
between 2 and 20 wt % copper,
between 2 and 6 wt % silicon,
between 4 and 8 wt % phosphorous,
between 0-10 wt % manganese,
less than 1 wt % inevitable impurities,
and at least 20 wt % iron,
wherein the iron based brazing filler metal powder has a mean particle size of 10-100 μm.

* * * * *